B. H. JEANES.
PUMP.
APPLICATION FILED AUG. 27, 1908.
929,224.
Patented July 27, 1909.
2 SHEETS—SHEET 1.
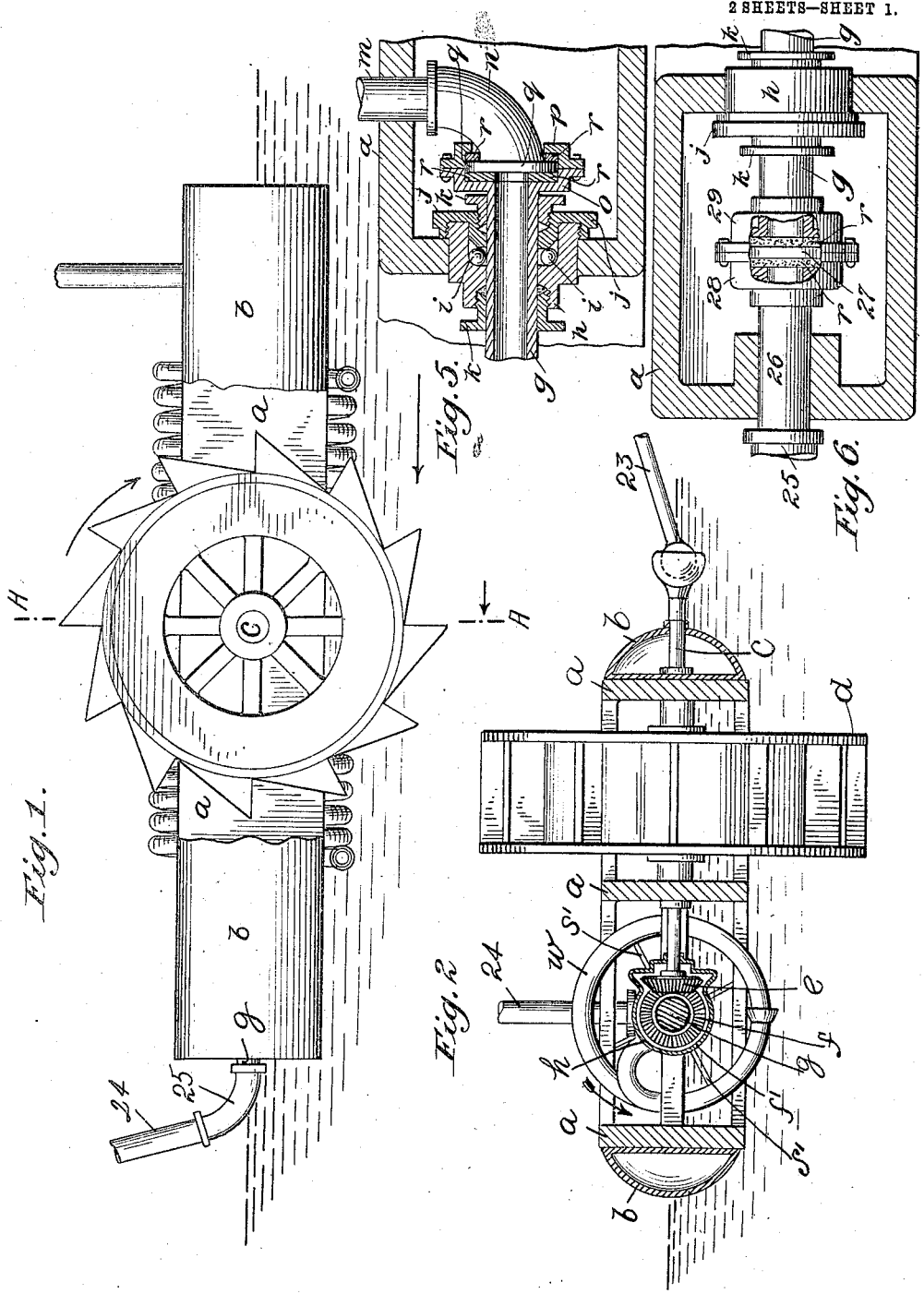

B. H. JEANES.
PUMP.
APPLICATION FILED AUG. 27, 1908.
929,224.
Patented July 27, 1909.
2 SHEETS—SHEET 2.
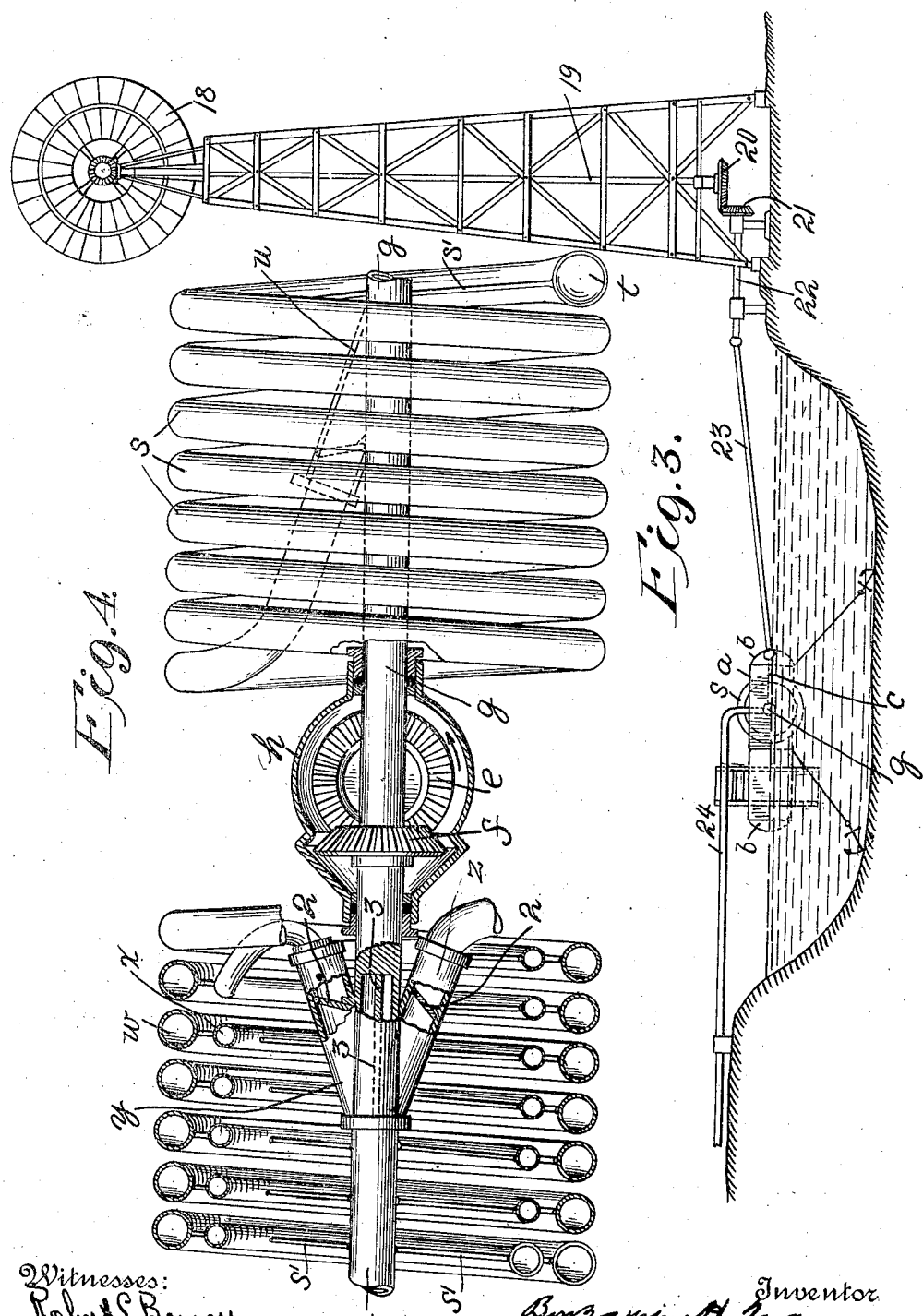

UNITED STATES PATENT OFFICE.

BENJAMIN H. JEANES, OF BALLINGER, TEXAS.

PUMP.

No. 929,224.  Specification of Letters Patent.  Patented July 27, 1909.

Application filed August 27, 1908. Serial No. 450,431.

*To all whom it may concern:*

Be it known that I, BENJAMIN H. JEANES, a citizen of the United States, residing at Ballinger, in the county of Runnels and State of Texas, have invented certain new and useful Improvements in Pumps, of which the following is a specification, reference being had to the accompanying drawings.

My invention relates to improvements in pumps, and particularly to improvements in rotary pumps; and an object of my invention is to provide a pump, which will be suitable for pumping water from running streams for purposes of irrigation and the like.

In the drawings illustrating the principle of my invention and the best mode now known to me of applying that principle, Figure 1 is an elevation showing my new pump mounted upon a float in a river; Fig. 2 is a section on the line A—A of Fig. 1; Fig. 3 shows the use of a windmill as an auxiliary source of power; Fig. 4 is a detail showing the coils of pipe; and Figs. 5 and 6 are details showing the mode in which the hollow shaft is connected with the discharge pipes at its ends and is mounted in the float.

The float is made up of wooden frame members $a$ and sheet-metal housings or casings $b$. Journaled in the frame members of the float is a shaft $c$, upon which is fastened an undershot water-wheel $d$. Upon the inner end of the shaft $c$ is mounted a bevel-gear $e$, which meshes with and drives the bevel-gear $f$ fast upon the central shaft $g$. The bevel gears $e$, $f$, are incased in a suitable housing $f'$. At each of its ends the shaft $g$ is hollow and passes through a journal-box $h$, between which and the pipe shaft $g$ are placed balls $i$, to form a ball-bearing. The balls $i$ are held in place by the cap $j$. Stuffing-boxes $k$ serve to prevent the entrance of water to the ball-bearing. The discharge pipe $m$ is connected by an elbow $n$ with the adjacent hollow end of the tubular main shaft $g$. The latter is formed with an annular flange $o$ to which is bolted a cap $p$. Within the housing formed by the cap $p$ and the annular flange $o$ is mounted the flange $q$ on the inner lower end of the elbow $n$. On each side of the flange $q$ is placed a packing ring or washer $r$.

Around the tubular shaft $g$ is coiled a pipe $s$, the outer end of which is formed with an intake mouth $t$ and the inner end of which is fastened to the shaft $g$, by the pipe connection $u$. Suitable spider-arms $s'$ serve to support the coiled pipe $s$ on the shaft $g$. As shown in Figs. 3 and 6, a double coil of pipe may be used, the coil $w$ being of larger diameter than the coil $x$. The latter empties through the pipe connection $v$ into the tubular end of the shaft $g$, while the coil $w$ empties into the same end through the pipe connection $z$. Suitable flap or clack valves 2 mounted in the pipe-connections $y$ and $z$ serve to prevent back flow and a partition wall 3 serves to separate the two streams from each other.

The discharge pipe 24 shown in Figs. 1 and 2, is connected by the elbow 25, as illustrated in Fig. 6, with the outer end of the pipe 26, the inner end of which is formed with a flange 27. The latter is mounted in a two-part casing made up of the cap 28 and the annular flange 29 on the discharge end of the shaft $g$. On each side of the flange 27 is placed a packing ring or washer $r$.

The force of the current drives the undershot water-wheel $d$ and thereby drives the main shaft $g$, whereby the coils of pipe $s$, $w$ and $x$, are rotated at a high rate of speed. By varying the ratio of the gearing, the speed of the shaft $g$ may be varied within any desired limits. The water discharged into the pipe connections $u$, $y$ and $z$, flows through the hollow ends of the main shaft $g$ into the discharge pipes, by which the water is conducted to any desired point.

I claim—

The combination with a support, of a hollow shaft mounted rotatably therein; mechanism for driving said shaft; a plurality of coils of helically-wound pipe mounted on opposite ends of said shaft, one end of each of which coils is open for the intake of the fluid and the other end of each of which coils is connected with said hollow shaft to discharge the fluid thereinto; the fluid issuing from opposite ends of said hollow shaft and said coils of pipe being carried by said shaft and rotating therewith.

In testimony whereof, I have hereunto set my hand at said Ballinger, in the presence of the two undersigned witnesses, this tenth day of August A. D., 1908.

BENJAMIN H. JEANES.

Witnesses:
ROBERT L. BENNETT,
JOHN A. HARBER.